(12) United States Patent
Huang et al.

(10) Patent No.: US 8,372,540 B2
(45) Date of Patent: Feb. 12, 2013

(54) ELECTRODE ACTIVE MATERIAL FOR SECONDARY ELECTROCHEMICAL CELL

(75) Inventors: Haitao Huang, Henderson, NV (US); M. Yazid Saidi, Henderson, NV (US)

(73) Assignee: Valence Technology, Inc., Las Vegas, NV (US)

( * ) Notice: Subject to any disclaimer, the term of this patent is extended or adjusted under 35 U.S.C. 154(b) by 212 days.

(21) Appl. No.: 12/752,707

(22) Filed: Apr. 1, 2010

(65) Prior Publication Data

US 2011/0070499 A1    Mar. 24, 2011

Related U.S. Application Data (60) Provisional application No. 61/169,999, filed on Apr. 16, 2009.

(51) Int. Cl.
　　*H01M 4/13*　　(2010.01)
　　*H01M 4/58*　　(2010.01)
　　*C01G 31/02*　　(2006.01)
(52) U.S. Cl. ................. 429/231.5; 423/594.17
(58) Field of Classification Search ............... 429/218.1, 429/231.5; 423/594.17
See application file for complete search history.

(56) References Cited

U.S. PATENT DOCUMENTS

| | | | |
|---|---|---|---|
| 5,871,866 | A | 2/1999 | Barker et al. |
| 6,387,568 | B1 | 5/2002 | Barker et al. |
| 6,528,033 | B1 | 3/2003 | Barker et al. |
| 6,645,452 | B1 | 11/2003 | Barker et al. |
| 6,702,961 | B2 | 3/2004 | Barker et al. |
| 6,716,372 | B2 | 4/2004 | Barker et al. |
| 6,730,281 | B2 | 5/2004 | Barker et al. |
| 6,930,331 | B2 | 8/2005 | Park et al. |
| 7,001,690 | B2 | 2/2006 | Barker et al. |
| 7,261,977 | B2 | 8/2007 | Barker et al. |
| 7,338,647 | B2 | 3/2008 | Huang et al. |
| 7,718,317 | B2 | 5/2010 | Adamson et al. |
| 2004/0185344 | A1 | 9/2004 | Barker et al. |
| 2007/0160519 | A1 | 7/2007 | Barker et al. |
| 2008/0241043 | A1 | 10/2008 | Barker et al. |
| 2008/0303004 | A1 | 12/2008 | Mao et al. |
| 2008/0305256 | A1 | 12/2008 | Kimble et al. |
| 2009/0035661 | A1 | 2/2009 | Swoyer et al. |
| 2009/0068080 | A1 | 3/2009 | Faulkner et al. |
| 2009/0148377 | A1 | 6/2009 | Mosage et al. |

*Primary Examiner* — Carlos Barcena
(74) *Attorney, Agent, or Firm* — Cynthia S. Kovacevic; Brian T. Mangum; Roger A. Williams

(57) ABSTRACT

The invention provides an electrochemical cell which includes a first electrode having a electrode active material, a second electrode which is a counter electrode to the first electrode, and an electrolyte. The positive electrode active material is represented by the general formula $A_aV_bNb_c(PO_4)_3$, wherein $0<a<9$, and $0<b,c<2$.

5 Claims, 4 Drawing Sheets

ELECTRODE ACTIVE MATERIAL FOR SECONDARY ELECTROCHEMICAL CELL

This application claims priority from U.S. Ser. No. 61/169,995, filed Apr. 16, 2009.

FIELD OF THE INVENTION

This invention relates to an electrochemical cell, and more particularly to a secondary electrochemical cell employing a phosphate-based active material.

BACKGROUND OF THE INVENTION

A battery pack consists of one or more electrochemical cells or batteries, wherein each cell typically includes a positive electrode, a negative electrode, and an electrolyte or other material for facilitating movement of ionic charge carriers between the negative electrode and positive electrode. As the cell is charged, cations migrate from the positive electrode to the electrolyte and, concurrently, from the electrolyte to the negative electrode. During discharge, cations migrate from the negative electrode to the electrolyte and, concurrently, from the electrolyte to the positive electrode.

SUMMARY OF THE INVENTION

The present invention provides a novel secondary electrochemical cell employing a positive electrode active material represented by the general formula:

$$A_aV_bNb_c(PO_4)_3,$$

wherein:
(i) A is selected from the group consisting of elements from Group I of the Periodic Table, and mixtures thereof, and $0<a<9$,
(ii) $0<b<2$,
(iii) $0<c<2$, and
wherein a, b and c are selected so as to maintain electroneutrality of the positive electrode active material in its nascent or as-synthesized state.

DETAILED DESCRIPTION OF THE PREFERRED EMBODIMENTS

It has been found that the novel electrochemical cells of this invention afford benefits over such materials and devices among those known in the art. Such benefits include, without limitation, one or more of enhanced cycling capability, enhanced reversibility, enhanced ionic conductivity, enhanced electrical conductivity, enhanced rate capability, and reduced costs. Specific benefits and embodiments of the present invention are apparent from the detailed description set forth herein below. It should be understood, however, that the detailed description and specific examples, while indicating embodiments among those preferred, are intended for purposes of illustration only and are not intended to limit the scope of the invention.

The present invention is directed to a positive electrode active material represented by the general formula (1):

$$A_aV_bNb_c(PO_4)_3, \quad (1)$$

wherein:
(i) A is selected from the group consisting of elements from Group I of the Periodic Table, and mixtures thereof, and $0<a<9$,
(ii) $0<b<2$,
(iii) $0<c<2$, and
wherein a, b and c are selected so as to maintain electroneutrality of the positive electrode active material in its nascent or as-synthesized state.

Unless otherwise specified, a variable described herein algebraically as equal to ("="), less than or equal to ("≦"), or greater than or equal to ("≧") a number is intended to subsume values or ranges of values about equal or functionally equivalent to the number. As referred to herein, "Group" refers to the Group numbers (i.e., columns) of the Periodic Table as defined in the current IUPAC Periodic Table. (See, e.g., U.S. Pat. No. 6,136,472, Barker et al., issued Oct. 24, 2000, incorporated by reference herein.) In addition, the recitation of a genus of elements, materials or other components, from which an individual component or mixture of components can be selected, is intended to include all possible sub-generic combinations of the listed components, and mixtures thereof.

The electrode active materials described herein are in their nascent or as-synthesized state, prior to undergoing cycling in an electrochemical cell. The components of the electrode active material are selected so as to provide an electrode active material which is charge-balanced upon synthesis. The stoichiometric values of one or more elements of the composition may take on non-integer values, and are generally governed by the formula (A):

$$a(V^A)+b(V^V)+c(V^{Nb})=9, \quad (A)$$

wherein $V^A$, $V^V$ and $V^{Nb}$ represent the oxidation states of composition variable A, vanadium and niobium, respectively, in the active material's nascent state.

For all embodiments described herein, composition variable A contains at least one element capable of forming a positive ion and undergoing deintercalation from the active material when an electrochemical cell containing the active material of the present invention is charged. In one embodiment, A is selected from the group consisting of elements from Group 1 of the Periodic Table, and mixtures thereof. In another subembodiment, in the material's as-synthesized or nascent state, A is lithium (Li). In another subembodiment, A is sodium (Na).

Preferably, a sufficient quantity (a) of composition variable A should be present so as to allow the vanadium to undergo oxidation/reduction during charging/discharging of the electrochemical cell, respectively. Removal of an amount of composition variable A from the electrode active material is accompanied by a change in oxidation state of at least the vanadium when the electrochemical cell is operating under normal operating conditions. As used herein, the term "normal operating conditions" refers to the intended voltage at which the cell is charged.

The amount of vanadium available for oxidation/reduction in the active material determines the amount of composition variable A that may be removed. Such concepts are, in general application, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000.

For all embodiments described herein, $0<a<9$. In one subembodiment, $0<a\leq6$. In another subembodiment, $0<a\leq3$. In another subembodiment, $2\leq a\leq5$. In another subembodiment, $a=3$.

For all embodiments described herein, V may be stoichiometrically partially substituted with Nb by isocharge or aliovalent substitution, in equal or unequal stoichiometric amounts. "Isocharge substitution" refers to a substitution of one element on a given crystallographic site with an element having the same oxidation state (e.g. substitution of $V^{3+}$ with $Nb^{3+}$). "Aliovalent substitution" refers to a substitution of one element on a given crystallographic site with an element of a different oxidation state (e.g. substitution of $V^{3+}$ with $Nb^{5+}$).

In one embodiment, V is partially substituted by an "oxidatively" equivalent stoichiometric amount of Nb, by aliovalent or isocharge substitution, whereby the electrode active material is represented by the general formula (2):

$$A_a V_{b-\frac{c}{V^V}} Nb_{\frac{c}{V^{Nb}}} (PO_4)_3, \quad (2)$$

wherein A, a, b, c, $V^V$ and $V^{Nb}$ are as described herein above.

In another embodiment, V is partially substituted by a stoichiometric amount of Nb, by aliovalent or isocharge substitution, whereby the electrode active material is represented by the general formula (3):

$$A_a V_{b-d} Nb_c (PO_4)_3, \quad (3)$$

wherein A, a and b are as described herein above, $0<d<2$, $0<c\leq d$, and the selection of a, b, c and d are generally governed by the formula (B):

$$a+b(V^V)+c(V^{Nb})=9+d(V^V), \quad (B)$$

wherein $V^V$ and $V^{Nb}$ represent the oxidation states of composition variable A, vanadium and niobium, respectively, in the active material's nascent state.

In another embodiment, V is partially substituted by an equivalent stoichiometric amount of Nb, by aliovalent substitution, whereby the electrode active material is represented by the general formula (4):

$$A_{3-e} V_{2-d} Nb_d (PO_4)_3, \quad (4)$$

wherein A and a is as described herein above, $0<d<2$, and $e=d(V^{Nb}-V^V)$, wherein $V^{Nb}$ and $V^V$ represent the oxidation states of niobium and vanadium, respectively, in the active material's nascent state.

In a subembodiment, V is partially substituted by an equivalent stoichiometric amount of Nb, by aliovalent substitution, whereby the electrode active material is represented by the general formula (5):

$$A_{3-2d} V_{2-d} Nb_d (PO_4)_3, \quad (5)$$

wherein A is as described herein above, $0<d<2$, $V^{Nb}=5+$, $V^V=3+$, wherein $V^{Nb}$ and $V^V$ represent the oxidation states of niobium and vanadium, respectively, in the active material's nascent state.

Non-limiting examples of active materials represented by general formulas (1) through (5) include the following: $Li_3V_{1.9}Nb_{0.06}(PO_4)_3$, $Li_5V_{1.95}Nb_{0.02}(PO_4)_3$, $Li_{6.25}V_{0.75}Nb_{0.5}(PO_4)_3$, $Li_{3.05}V_{1.9}Nb_{0.05}(PO_4)_3$, and $Li_{2.6}V_{1.8}Nb_{0.2}(PO_4)_3$.

Active materials of general formulas (1) through (5) are readily synthesized by reacting starting materials in a solid state reaction, with or without simultaneous oxidation or reduction of the metal species involved. Sources of composition variable A include any of a number of salts or ionic compounds of lithium, sodium, potassium, rubidium or cesium. Lithium, sodium, and potassium compounds are preferred. Preferably, the alkali metal source is provided in powder or particulate form. A wide range of such materials is well known in the field of inorganic chemistry. Non-limiting examples include the lithium, sodium, and/or potassium fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germinates, oxides, acetates, oxalates, and the like. Hydrates of the above compounds may also be used, as well as mixtures. In particular, the mixtures may contain more than one alkali metal so that a mixed alkali metal active material will be produced in the reaction.

Sources of the vanadium and niobium include, without limitation, vanadium and niobium fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, oxalates, and the like. Hydrates may also be used, as well as mixtures of metals, as with the alkali metals, so that alkali metal mixed metal active materials are produced. The vanadium and niobium in the starting materials may have any oxidation state, depending the oxidation state required in the desired product and the oxidizing or reducing conditions contemplated, as discussed below.

Sources for phosphate component are provided by a number of salts or compounds containing positively charged cations in addition to the source of the phosphate. Such cations include, without limitation, metal ions such as the alkali metals, alkaline metals, transition metals, or other non-transition metals, as well as complex cations such as ammonium or quaternary ammonium. The phosphate anion in such compounds may be phosphate, hydrogen ammonium phosphate, or dihydrogen ammonium phosphate. As with the alkali metal source and metal source discussed above, the phosphate species starting materials are preferably provided in particulate or powder form. Hydrates of any of the above may be used, as can mixtures of the above.

A starting material may provide more than one of composition components A, V, Nb and $PO_4$ as is evident in the list above. In various embodiments of the invention, starting materials are provided that combine, for example, composition components A and $PO_4$, thus requiring only vanadium and niobium be added. In one embodiment, a starting material is provided that contains alkali metal, one of V and Nb, and the phosphate. Combinations of starting materials providing each of the components may also be used. It is preferred to select starting materials with counterions that give rise to volatile by-products. Thus, it is desirable to choose ammonium salts, carbonates, oxides, and the like where possible. Starting materials with these counterions tend to form volatile by-products such as water, ammonia, and carbon dioxide, which can be readily removed from the reaction mixture.

The sources of composition components A, V, Nb and $PO_4$, may be reacted together in solid state form while heating for a time and temperature sufficient to form a reaction product. The starting materials can be provided in powder or particulate form. The powders are mixed together with any of a variety of procedures, such as by ball milling without attrition, blending in a mortar and pestle, and the like. Thereafter the mixture of powdered starting materials is compressed into a tablet and/or held together with a binder material to form a closely cohering reaction mixture. The reaction mixture is heated in an oven, typically at a temperature of about 400° C. or greater until a reaction product forms. Exemplary times and temperatures for the reaction are given in the Examples below.

Another means for carrying out the reaction at a lower temperature is hydrothermally. In a hydrothermal reaction, the starting materials are mixed with a small amount of a liquid such as water, and placed in a pressurized bomb. The reaction temperature is limited to that which can be achieved by heating the liquid water in a continued volume creating an increased pressure, and the particular reaction vessel used.

The reaction may be carried out without redox, or if desired under reducing or oxidizing conditions. When the reaction is done without redox, the oxidation state of components in the reaction product is the same as in the starting materials. Oxidizing conditions may be provided by running the reaction in air. Thus, oxygen from the air is used to oxidize the starting material containing the transition metal.

The reaction may also be carried out with reduction. For example, the reaction may be carried out in a reducing atmosphere such as hydrogen, ammonia, methane, or a mixture of reducing gases. Alternatively, the reduction may be carried out in-situ by including in the reaction mixture a reductant that will participate in the reaction to reduce the one or more reaction components to the oxidation state of that component in the final reaction product, but that will produce by-products that will not interfere with the active material when used later in an electrode or an electrochemical cell. One convenient reductant to use to make the active materials of the invention is a reducing carbon. In a preferred embodiment, the reaction is carried out in an inert atmosphere such as argon, nitrogen, or carbon dioxide. Such reducing carbon is conveniently provided by elemental carbon, or by an organic material that can decompose under the reaction conditions to form elemental carbon or a similar carbon containing species that has reducing power. Such organic materials include, without limitation, glycerol, starch, sugars, cokes, and organic polymers which carbonize or pyrolize under the reaction conditions to produce a reducing form of carbon. A preferred source of reducing carbon is elemental carbon.

It is usually easier to provide the reducing agent in stoichiometric excess and remove the excess, if desired, after the reaction. In the case of the reducing gases and the use of reducing carbon such as elemental carbon, any excess reducing agent does not present a problem. In the former case, the gas is volatile and is easily separated from the reaction mixture, while in the latter, the excess carbon in the reaction product does not harm the properties of the active material, because carbon is generally added to the active material to form an electrode material for use in the electrochemical cells and batteries of the invention. Conveniently also, the by-products carbon monoxide or carbon dioxide (in the case of carbon) or water (in the case of hydrogen) are readily removed from the reaction mixture.

The carbothermal reduction method of synthesis of mixed metal phosphates has been described in PCT Publication WO01/53198, Barker et al. The carbothermal method may be used to react starting materials in the presence of reducing carbon to form a variety of products. The carbon functions to reduce one or more of the active material components relative to their oxidation state in the corresponding starting material(s). The reducing carbon, for example in the form of elemental carbon powder, is mixed with the other starting materials and heated. For best results, the temperature should be about 400° C. or greater, and up to about 950° C. Higher temperatures may be used, but are usually not required.

The active materials of the present invention may also be produced by a wet blend method. The process includes forming an aqueous mixture containing at least $H_2O$, a polymeric material, a phosphate anion source, a source for composition variable A, a niobium source, a vanadium source such as $V_2O_5$ or $V_2O_3$, and a source of carbon. The aqueous mixture is then wet blended and then spray dried to form a precursor composition. The precursor composition is optionally ball milled and then pelletized. The precursor composition or pelletized precursor composition is then heated or calcined to produce the product active material.

One particular wet blend method includes reacting vanadium pentoxide ($V_2O_5$) with an acidic phosphate solution, for example phosphoric acid ($H_3PO_4$) to form a slurry. The slurry is then mixed with a solution containing water and a basic lithium compound such as lithium hydroxide (LiOH) to form a second slurry. A polymeric material and a source of carbon are added to the second slurry to form a third slurry. The third slurry is wet blended and then spray dried to form a precursor composition. The precursor composition is then optionally ball milled and pelletized. The precursor composition or pelletized precursor composition is then heated at a time and temperature sufficient to produce the electrode active material of the present invention.

The vanadium pentoxide is made partially or completely soluble in water-based solutions by raising or lowering the pH from neutral. This allows for a uniform precursor mixture that provides faster or lower temperature synthesis of lithium vanadium phosphate materials. In one embodiment the $V_2O_5$ is added to $H_3PO_4$ first and then mixed with a solution of a hydroxide of composition variable A dissolved in water. In another embodiment the $V_2O_5$ is reacted with a hydroxide of composition variable A and then neutralized by addition of and acid such as $H_3PO_4$.

Another wet blend method includes preparing an aqueous solution of a hydroxide of composition variable A. Vanadium pentoxide is then partially dissolved in the aqueous solution. Phosphoric acid ($H_3PO_4$) is then added to the aqueous solution to form a neutralized solution. A polymeric material, a niobium source, and a source of carbon are added to the neutralized solution to form a slurry. The polymeric material also acts to form a conductive network throughout the product electrode active material. The slurry is wet blended and then dried either by spray drying or heating, to form a precursor composition. The precursor composition is then optionally ball milled and pelletized. The precursor composition or pelletized precursor composition is then heated to produce the electrode active material of the present invention.

Another wet blend method includes forming a mixture comprising a solvent having a boiling point, together with a polymeric material, a phosphate source, source of composition variable A, source of vanadium and source of niobium, and heating the mixture so formed at a temperature greater than the boiling point of the solvent for a period of time sufficient to remove substantially all the solvent to produce an essentially dry mixture, and heating the dried mixture so obtained to produce an electrode material of the present invention. The phosphate source and polymeric material are preferably capable of forming a solution in the solvent without substantial phase separation with the solvent.

The method may include dissolving a polymeric material in a solvent to form a first solution, adding a phosphate source or alternatively source containing both phosphate and composition variable A to the first solution while stirring to form a first slurry, adding a source of vanadium and niobium to the first slurry while stirring to form a second slurry, heating said second slurry at a temperature and for a time sufficient to form an essentially dried mixture, then heating said mixture at a temperature and for a time sufficient to produce the electrode active material of the present invention.

The method may also include dissolving a polymeric material in a solvent to form a first solution. The solvent can be any volatile solvent that can dissolve the polymeric material. Preferably, the solvent is a volatile solvent having a boiling point of less than about 300° C., preferably less than 200° C. and more preferably less than 120° C. In a preferred embodiment the solvent is water. A phosphate source (or source containing phosphate and composition variable A) is added to the first solution while stirring to form a first slurry. A source of vanadium and niobium then added to the first slurry to form a second slurry. The second slurry is then heated at a temperature greater than the boiling point of the solvent to produce an essentially dried mixture. The dried mixture is then ball milled and heated to produce the electrode active material of the present invention.

It is understood and one skilled in the art would recognize that although the preferred embodiment described above, states the order in which the polymeric material, the phosphate source and the sources for vanadium and niobium are added to form the slurry, the phosphate source, vanadium source and niobium can be added to the solvent in any order. For example, the sources for composition variable A, $PO_4$, V and Nb can be added to the solvent and then the polymeric material can be added. Alternatively, sources for composition variable A, V and Nb can be added to the solvent, then the polymeric material and then the phosphate source. The polymer can be added to the solvent first, then the composition variable A, Nb and V sources added and then the phosphate source can be added in an alternative embodiment.

In the preferred embodiment the polymeric material is added first since the polymeric material is soluble in the solvent it is easy to discern when the polymeric material is dissolved. The phosphate source is then added in the preferred embodiment. The phosphate source is also soluble in the solvent and therefore it can be readily determined when the phosphate source is dissolved. The composition variable A, V and Nb sources are added last in that these sources may not dissolve in the solvent and may color the solution, as in the case of $V_2O_3$ the solution turns black.

In a preferred embodiment of the present invention an amount of polymeric material is dissolved in water to form a first solution. A source containing both composition variable A and phosphate is added to the first solution while stirring to form a first slurry. Source of V and Nb are added to the first slurry while stirring to produce a second slurry. The second slurry is then dried for 24 hours at a temperature greater than the boiling point of the solvent. The resulting dried powder is then pelletized and fired in a tube furnace.

Methods of making the electrode active materials described by general formulas (1) through (5) are generally known in the art and described in the literature, and are also described in: WO 01/54212 to Barker et al., published Jul. 26, 2001; International Publication No. WO 98/12761 to Barker et al., published Mar. 26, 1998; WO 00/01024 to Barker et al., published Jan. 6, 2000; WO 00/31812 to Barker et al., published Jun. 2, 2000; WO 00/57505 to Barker et al., published Sep. 28, 2000; WO 02/44084 to Barker et al., published Jun. 6, 2002; WO 03/085757 to Saidi et al., published Oct. 16, 2003; WO 03/085771 to Saidi et al., published Oct. 16, 2003; WO 03/088383 to Saidi et al., published Oct. 23, 2003; U.S. Pat. No. 6,528,033 to Barker et al., issued Mar. 4, 2003; U.S. Pat. No. 6,387,568 to Barker et al., issued May 14, 2002; U.S. Publication No. 2003/0027049 to Barker et al., published Feb. 2, 2003; U.S. Publication No. 2002/0192553 to Barker et al., published Dec. 19, 2002; U.S. Publication No. 2003/0170542 to Barker at al., published Sep. 11, 2003; and U.S. Publication No. 2003/1029492 to Barker et al., published Jul. 10, 2003.

Compounds such as monoclinic lithium vanadium phosphate, $Li_3V_2(PO_4)_3$ or LVP are commonly synthesized at temperatures of 700° C. and above. At these temperatures, this material may be susceptible to damage from a few percent hydrogen in the synthesis atmosphere. The hydrogen may be added to the atmosphere intentionally or it may be a by-product of the synthesis reaction. The presence of hydrogen in the synthesis atmosphere reduces initial specific capacity and increases cycle fading in materials produced in such atmosphere. It is therefore preferable to synthesize LVP under a hydrogen free atmosphere.

To prevent hydrogen damage it is necessary to remove all sources of hydrogen before the precursor reaches 700° C. Water and organic vapor are likely by-products of the LVP formation reaction and both are potential sources of hydrogen, especially in the presence of residual carbon. To prevent potential damage from hydrogen during the synthesis, the following techniques may be useful. 1) A wait step in the heating ramp profile can be employed to allow by-products to evolve at a temperature below 700° C.; for instance stopping the heating ramp at a temperature of 350° C. and holding at that temperature for about one to about two hours. 2) Modified furnace loading conditions such as powder beds shallower than about 4 cm depth and more preferably shallower than about 2 cm depth will prevent the entrapment of gaseous by-products in the powder beds and 3) more rapid gas purge rate can accelerate the removal of hydrogen-producing by-products before high temperatures are reached.

The present invention also provides an electrochemical cell or battery containing:
 (a) a first electrode (also commonly referred to as a positive electrode or cathode) which includes an active material of the present invention;
 (b) a second electrode (also commonly referred to as a negative electrode or anode) which is a counter-electrode to the first electrode; and
 (c) an electrolyte in ion-transfer communication with the first and second electrodes.

The architecture of a battery is not limited to any particular architecture, and may be selected from the group consisting of cylindrical wound designs, z-fold designs, wound prismatic and flat-plate prismatic designs, and polymer laminate designs.

Figure 1:
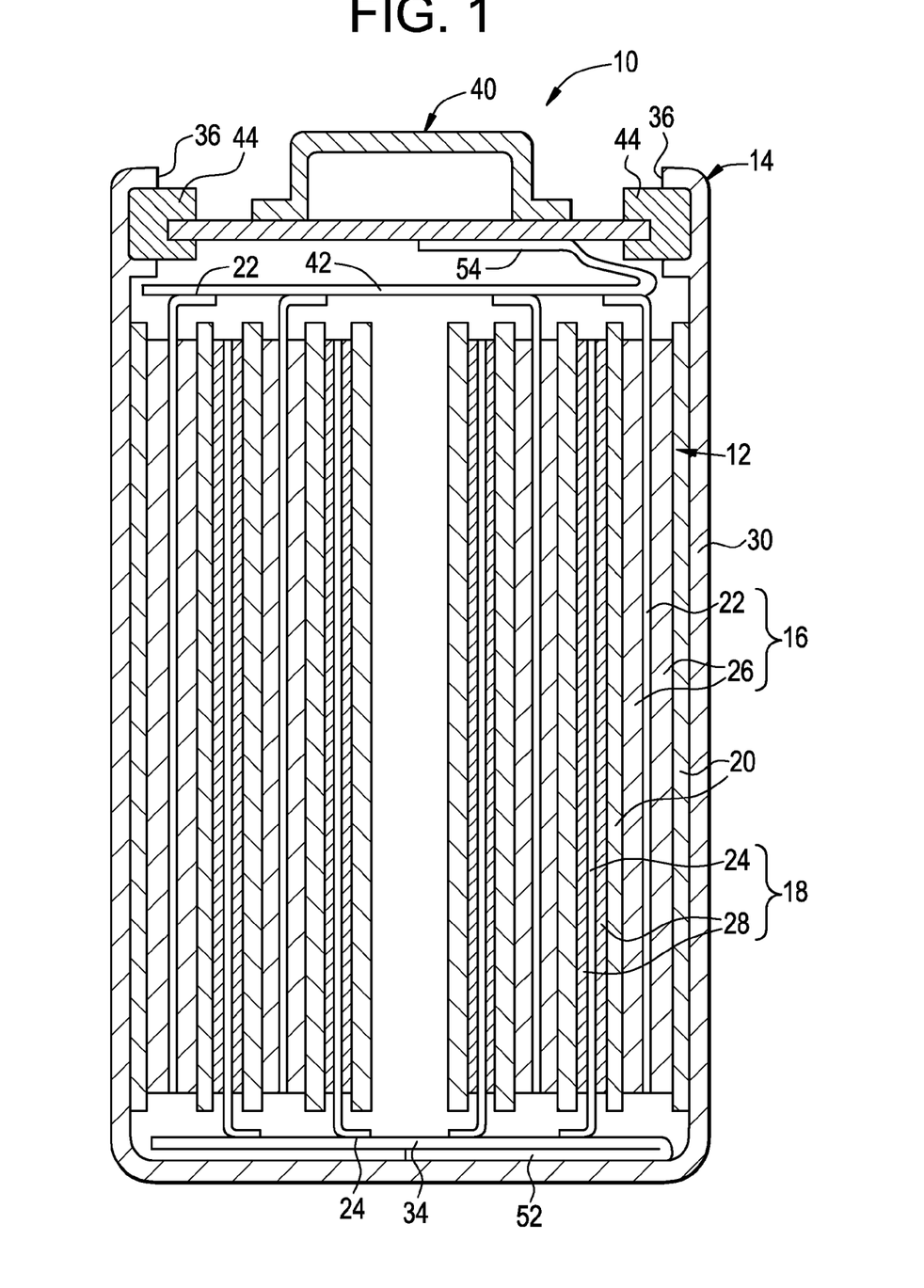
FIG. 1 is a schematic cross-sectional diagram illustrating the structure of a non-aqueous electrolyte cylindrical electrochemical cell of the present invention.

Referring to FIG. 1, in one embodiment the electrochemical cell 10 includes a spirally coiled or wound electrode assembly 12 enclosed in a sealed container, preferably a rigid cylindrical casing 14 as illustrated in FIG. 1. In one subembodiment, the cell 10 is a prismatic-type cell, and the casing has a substantially rectangular cross-section (not illustrated).

Referring again to FIG. 1, the electrode assembly 12 includes: a positive electrode 16 consisting of, among other things, an electrode active material represented by general formulas (1) through (5) described herein below; a counter negative electrode 18; and a separator 20 interposed between the first and second electrodes 16,18. The separator 20 is preferably an electrically insulating, ionically conductive microporous film, and is composed of a polymeric material selected from the group consisting of polyethylene, polyethylene oxide, polyacrylonitrile and polyvinylidene fluoride, polymethyl methacrylate, polysiloxane, copolymers thereof, and admixtures thereof.

Each electrode 16,18 includes a current collector 22 and 24, respectively, for providing electrical communication between the electrodes 16,18 and an external load. Each current collector 22,24 is a foil or grid of an electrically conductive metal such as iron, copper, aluminum, titanium, nickel, stainless steel, or the like, having a thickness of between 5 µm and 100 µm, preferably 5 µm and 20 µm. Optionally, the current collector may be treated with an oxide-removing agent such as a mild acid and the like, and coated with an electrically conductive coating for inhibiting the formation of electrically insulating oxides on the surface of the current collector 22,24. Examples of a suitable coatings include polymeric materials comprising a homogenously dispersed electrically conductive material (e.g. carbon), such polymeric materials including: acrylics including acrylic acid and methacrylic acids and esters, including poly (ethylene-co-acrylic acid); vinylic materials including poly(vinyl acetate) and poly(vinylidene fluoride-co-hexafluoropropylene); polyesters including poly(adipic acid-co-ethylene glycol); polyurethanes; fluoroelastomers; and mixtures thereof.

The positive electrode 16 further includes a positive electrode film 26 formed on at least one side of the positive electrode current collector 22, preferably both sides of the positive electrode current collector 22, each film 26 having a thickness of between 10 µm and 150 µm, preferably between 25 µm and 125 µm, in order to realize the optimal capacity for the cell 10. The positive electrode film 26 is composed of between 80% and 95% by weight of an electrode active material represented by general formulas (1) through (5), between 1% and 10% by weight binder, and between 1% and 10% by weight electrically conductive agent.

Suitable binders include: polyacrylic acid; carboxymethylcellulose; diacetylcellulose; hydroxypropylcellulose; polyethylene; polypropylene; ethylene-propylene-diene copolymer; polytetrafluoroethylene; polyvinylidene fluoride; styrene-butadiene rubber; tetrafluoroethylene-hexafluoropropylene copolymer; polyvinyl alcohol; polyvinyl chloride; polyvinyl pyrrolidone; tetrafluoroethylene-perfluoroalkylvinyl ether copolymer; vinylidene fluoride-hexafluoropropylene copolymer; vinylidene fluoride-chlorotrifluoroethylene copolymer; ethylenetetrafluoroethylene copolymer; polychlorotrifluoroethylene; vinylidene fluoride-pentafluoropropylene copolymer; propylene-tetrafluoroethylene copolymer; ethylene-chlorotrifluoroethylene copolymer; vinylidene fluoride-hexafluoropropylene-tetrafluoroethylene copolymer; vinylidene fluoride-perfluoromethylvinyl ether-tetrafluoroethylene copolymer; ethylene-acrylic acid copolymer; ethylene-methacrylic acid copolymer; ethylene-methyl acrylate copolymer; ethylene-methyl methacrylate copolymer; styrene-butadiene rubber; fluorinated rubber; polybutadiene; and admixtures thereof. Of these materials, most preferred are polyvinylidene fluoride and polytetrafluoroethylene.

Suitable electrically conductive agents include: natural graphite (e.g. flaky graphite, and the like); manufactured graphite; carbon blacks such as acetylene black, Ketzen black, channel black, furnace black, lamp black, thermal black, and the like; conductive fibers such as carbon fibers and metallic fibers; metal powders such as carbon fluoride, copper, nickel, and the like; and organic conductive materials such as polyphenylene derivatives.

The negative electrode 18 is formed of a negative electrode film 28 formed on at least one side of the negative electrode current collector 24, preferably both sides of the negative electrode current collector 24. In one subembodiment, the negative electrode is an alkali metal foil, such as a lithium metal foil. In another subembodiment, the negative electrode film 28 is composed of between 80% and 95% of an intercalation material, between 2% and 10% by weight binder, and (optionally) between 1% and 10% by of an weight electrically conductive agent.

Intercalation materials suitable herein include: transition metal oxides, metal chalcogenides, carbons or carbonaceous materials (e.g. graphite), and mixtures thereof. In one embodiment, the intercalation material is graphite.

Referring again to FIG. 1, The cylindrical casing 14 includes a cylindrical body member 30 having a closed end 32 in electrical communication with the negative electrode 18 via a negative electrode lead 34, and an open end defined by crimped edge 36. In operation, the cylindrical body member 30, and more particularly the closed end 32, is electrically conductive and provides electrical communication between the negative electrode 18 and an external load (not illustrated). An insulating member 38 is interposed between the spirally coiled or wound electrode assembly 12 and the closed end 32.

A positive terminal cap 40 in electrical communication with the positive electrode 16 via a positive electrode lead 42 provides electrical communication between the positive electrode 16 and the external load (not illustrated). A gasket member 44 sealingly engages the upper portion of the cylindrical body member 30 to the positive terminal cap 40.

A non-aqueous electrolyte (not shown) provides ionic communication between the positive electrode 16 and the negative electrode 18, by transferring ionic charge carriers between the positive electrode 16 and the negative electrode 18 during charge and discharge of the electrochemical cell 10. The electrolyte includes a non-aqueous solvent and an alkali metal salt dissolved therein. Suitable solvents include: a cyclic carbonate such as ethylene carbonate, propylene carbonate, butylene carbonate or vinylene carbonate; a non-cyclic carbonate such as dimethyl carbonate, diethyl carbonate, ethyl methyl carbonate or dipropyl carbonate; an aliphatic carboxylic acid ester such as methyl formate, methyl acetate, methyl propionate or ethyl propionate; a .gamma.-lactone such as γ-butyrolactone; a non-cyclic ether such as 1,2-dimethoxyethane, 1,2-diethoxyethane or ethoxymethoxyethane; a cyclic ether such as tetrahydrofuran or 2-methyltetrahydrofuran; an organic aprotic solvent such as dimethylsulfoxide, 1,3-dioxolane, formamide, acetamide, dimethylformamide, dioxolane, acetonitrile, propylnitrile, nitromethane, ethyl monoglyme, phosphoric acid triester, trimethoxymethane, a dioxolane derivative, sulfolane, methylsulfolane, 1,3-dimethyl-2-imidazolidinone, 3-methyl-2-oxazolidinone a propylene carbonate derivative, a tetrahydrofuran derivative, ethyl ether, 1,3-propanesultone, anisole, dimethylsulfoxide and N-methylpyrrolidone; and mixtures thereof. A mixture of a cyclic carbonate and a non-cyclic carbonate or a mixture of a cyclic carbonate, a non-cyclic carbonate and an aliphatic carboxylic acid ester, are preferred.

Suitable alkali metal salts include: $LiClO_4$; $LiBF_4$; $LiPF_6$; $LiAlCl_4$; $LiSbF_6$; LiSCN; LiCl; $LiCF_3SO_3$; $LiCF_3CO_2$; $Li(CF_3SO_2)_2$; $LiAsF_6$; $LiN(CF_3SO_2)_2$; $LiB_{10}Cl_{10}$, lithium bis(oxalate)borate; a lithium lower aliphatic carboxylate; LiCl; LiBr; LiI; a chloroboran of lithium; lithium tetraphenylborate; lithium imides; sodium and potassium analogues of the aforementioned lithium salts; and mixtures thereof. Preferably, the electrolyte contains at least $LiPF_6$.

The following non-limiting examples illustrate the compositions and methods of the present invention.

EXAMPLE 1

Electrode active materials representative of the general formula $Li_{a-2d}V_{2-d}Nb_d(PO_4)_3$, were made for various values of stoichiometric variable d, according to the following general reaction scheme.

To make the $Li_{a-2d}V_{2-d}Nb_d(PO_4)_3$ active material, the requisite amounts (based on the target value for stoichiometric variable d) of the $LiH_2PO_4$ (1 wt % excess), $V_2O_3$, $Nb_2O_5$ and $NH_4H_2PO_4$ precursors were premixed and then milled using zirconia media in a ceramic jar containing acetone for 20 hours. After milling, the acetone was extracted and the dried powder was pelletized, placed in a tube oven and heated in a flowing argon atmosphere at a rate of 5° C./min to an ultimate temperature of 950° C. The temperature was maintained for 2 hours, after which the sample was ground and ball milled again (without acetone) for 20 hours, repelletized, and heated under the same firing conditions stated above, to yield the product active material.

EXAMPLE 2

Electrode active materials representative of the general formula $Li_{a-2d}V_{2-d}Nb_d(PO_4)_3$ and synthesized per the teachings of Example 1, were further processed according to the following general reaction scheme in order to yield a carbon-containing material.

To make the carbon-containing $Li_{a-2d}V_{2-d}Nb_d(PO_4)_3/C$ material, the $Li_{a-2d}V_{2-d}Nb_d(PO_4)_3$ reaction product synthesized per the teachings of Example 1 was first ball milled for 20 hours using zirconia media in a ceramic jar containing acetone. After milling, the acetone was extracted and 11 g of the dried $Li_{a-2d}V_{2-d}Nb_d(PO_4)_3$ active material was mixed with 0.4583 g carbon (Super P) and 0.33 g polyethylene glycol (PEG). The resulting mixture was ball milled using zirconia media in a ceramic jar for 20 hours, and subsequently placed in a tube oven and heated in a flowing argon atmosphere at a rate of 5° C./min to an ultimate temperature of 650° C. The temperature was maintained for 2 hours to yield the product $Li_{a-2d}V_{2-d}Nb_d(PO_4)_3/C$ composite material.

EXAMPLE 3

A carbon-containing electrode active materials representative of the general formula $Li_{a-2d}V_{2-d}Nb_d(PO_4)_3$ were made for various values of stoichiometric variable d, according to the following general reaction scheme.

To make the carbon-containing $Li_{a-2d}V_{2-d}Nb_d(PO_4)_3/C$ material, the requisite amounts (based on the target value for stoichiometric variable d) of the $LiH_2PO_4$ (1 wt % excess), $V_2O_3$, $Nb_2O_5$, $NH_4H_2PO_4$, carbon (Super P) and polyethylene glycol (PEG) precursors were premixed and then milled for 20 hours using zirconia media in a ceramic jar. After milling, the mixture was placed in a tube oven and heated in a flowing argon atmosphere at a rate of 5° C./min to an ultimate temperature of 950° C. The temperature was maintained for 4 hours to yield the product $Li_{a-2d}V_{2-d}Nb_d(PO_4)_3/C$ active material.

EXAMPLE 4

Electrode active material having the formula $Li_3V_2(PO_4)_3$ was made according to the following reaction scheme.

To make the $Li_3V_2(PO_4)_3$ active material, 23.4136 g of $LiH_2PO_4$ (1 wt % excess) and 11.1991 g of $NH_4H_2PO_4$ were premixed and then milled using zirconia media in a ceramic jar containing acetone for 20 hours. After milling, the acetone was extracted and the dried powder was pelletized, placed in a tube oven and heated in a flowing argon atmosphere at a rate of 5° C./min to an ultimate temperature of 950° C. The temperature was maintained for 2 hours, after which the sample was ground and ball milled again (without acetone) for 20 hours, repelletized, and heated under the same firing conditions stated above, to yield the product active material.

EXAMPLE 5

Figure 2A:
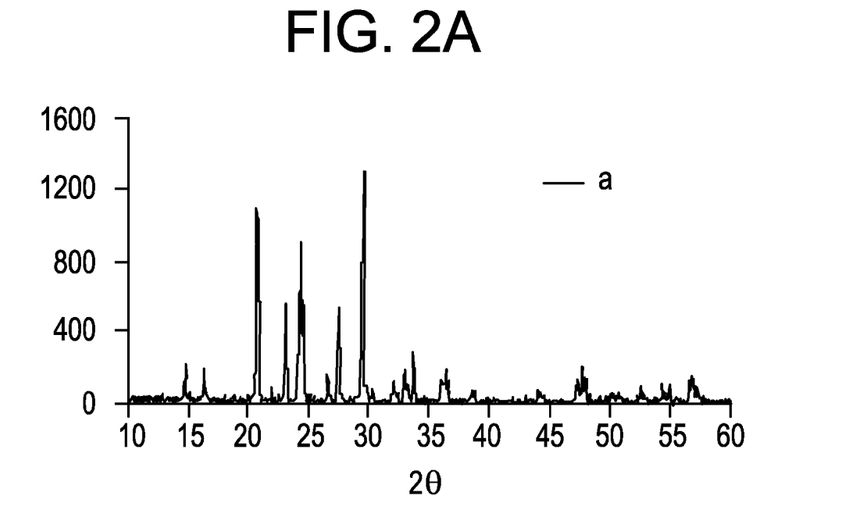
FIG. 2a shows the results of an x-ray diffraction analysis of $Li_3V_2(PO_4)_3$ synthesized per the teachings of Example 4.
Figure 2B:
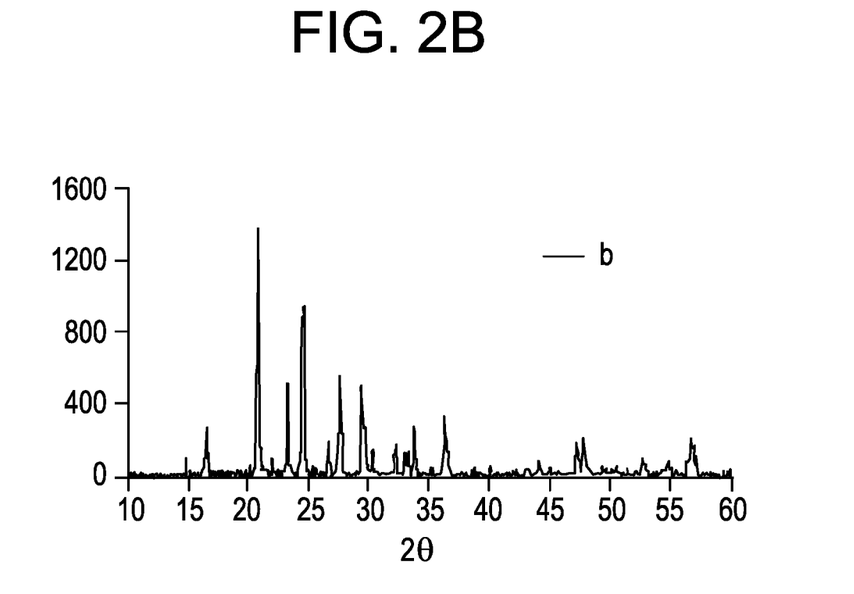
FIG. 2b shows the results of an x-ray diffraction analysis of $Li_{2.6}V_{1.8}Nb_{0.2}(PO_4)_3$ synthesized per the teachings of Example 1.

$Li_{2.6}V_{1.8}Nb_{0.2}(PO_4)_3$ active material synthesized per the teachings of Example 1 was analyzed by x-ray powder diffraction CuKα radiation, λ=1.5418 Å, and yielded the following values: a=8.613034 Å; b=8.636577 Å; c=12.060527; cell volume=897.148 Å. The x-ray diffraction patterns of $Li_3V_2(PO_4)_3$ synthesized per Example 4 and $Li_{2.6}V_{1.8}Nb_{0.2}(PO_4)_3$ are presented in FIG. 2 as patterns (a) and (b), respectively.

EXAMPLE 6

Electrode active materials representative of the general formula $Li_{a-2d}V_{2-d}Nb_d(PO_4)_3$ were synthesized for d=0, 0.025, 0.05, 0.075, 0.1, 0.15 and 0.2 per the teachings of Example 1.

Figure 3:
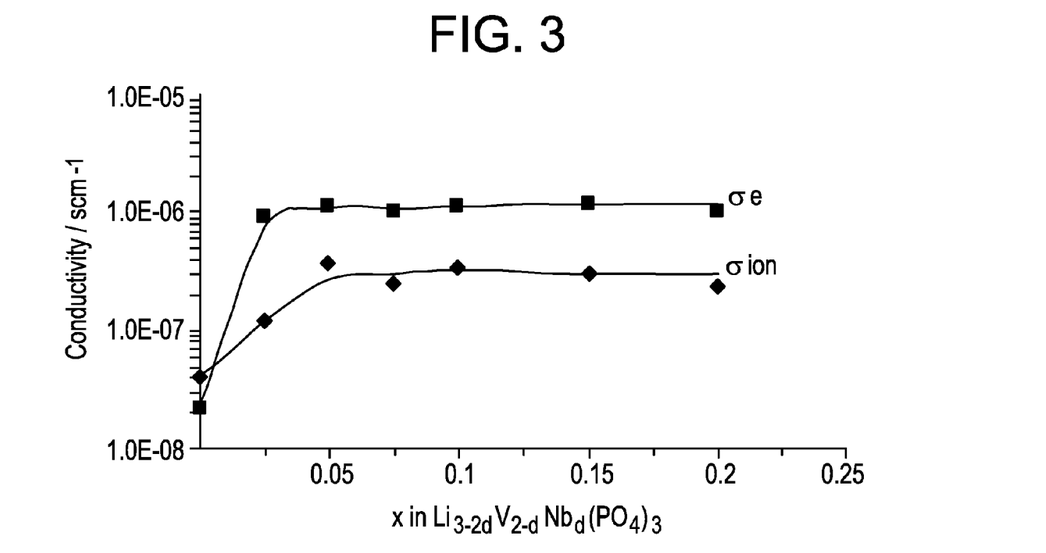
FIG. 3 is a plot of electrical and ionic conductivity as a function of the value of stoichiometric variable d in electrode active materials representative of the general formula $Li_{a-2d}V_{2-d}Nb_d(PO_4)_3$.

To measure ionic conductivity of the electrode active materials, the following experiment was conducted. 1 g of each product active material was pressed between a stainless steel disk and an opposing copper disk (each 2.85 cm²) under a pressure of 10 pounds while a voltage of 0.5 V was applied to the disks for 60 seconds. During this dc polarization, initial current arises from both ionic and electronic carriers, $I_{initial}=(V_{applied}/R_0)$ and $[R_{initial}=(R_{ionic} \times R_e)/(R_{ionic}+R_e)]$ where $R_{ionic}$ and $R_e$ refer to the ionic and electrical resistances, respectively, due to cations and the electronic carriers. With increasing time, the partial current of the blocked electrons decreases, and eventually vanishes, leading to a steady current being $I_{stable}=(V_{applied}/R_{ionic})$ in which the current is carried only by the non-blocked ions. Electronic/ionic conductivities measured from this polarization experiment are presented in FIG. 3. As can be seen from FIG. 3, niobium substitution enhanced the ionic and electrical conductivity of this active material by approximately 50 times (5,000%) when the values for stoichiometric variable d were above 0.025.

EXAMPLE 7

Electrode active material samples representative of the general formula $Li_{a-2d}V_{2-d}Nb_d(PO_4)_3$ were synthesized per the teachings of Example 2 for d=0, 0.1 and 0.2.

For each sample, and electrode was made with 88% $Li_{a-2d}V_{2-d}Nb_d(PO_4)_3$ active material, 8% conducting carbon (Super P) and 4% PVDF binder (KYNAR® HSV 900), which were mixed in N-methylpyrrolidone (NMP) and the resulting slurry was coated on aluminum foil, and then dried at 120° C. under vacuum. The active loading of each electrode was 8-9 $mg/cm^2$.

Lithium-metal cells were constructed, each employing one of the cathodes, a lithium-metal counter electrode, an electrolyte containing 1M $LiPF_6$ solution in ethylene carbonate/dimethyl carbonate (2:1 by weight) and a dried glass fiber filter (Whatman, Grade GF/A) was used as electrode separator ($Li_{a-2d}V_{2-d}Nb_d(PO_4)_3$/1M $LiPF_6$ (EC/DMC)/Li). The cathode area was 2.85 $cm^2$.

Figure 4:
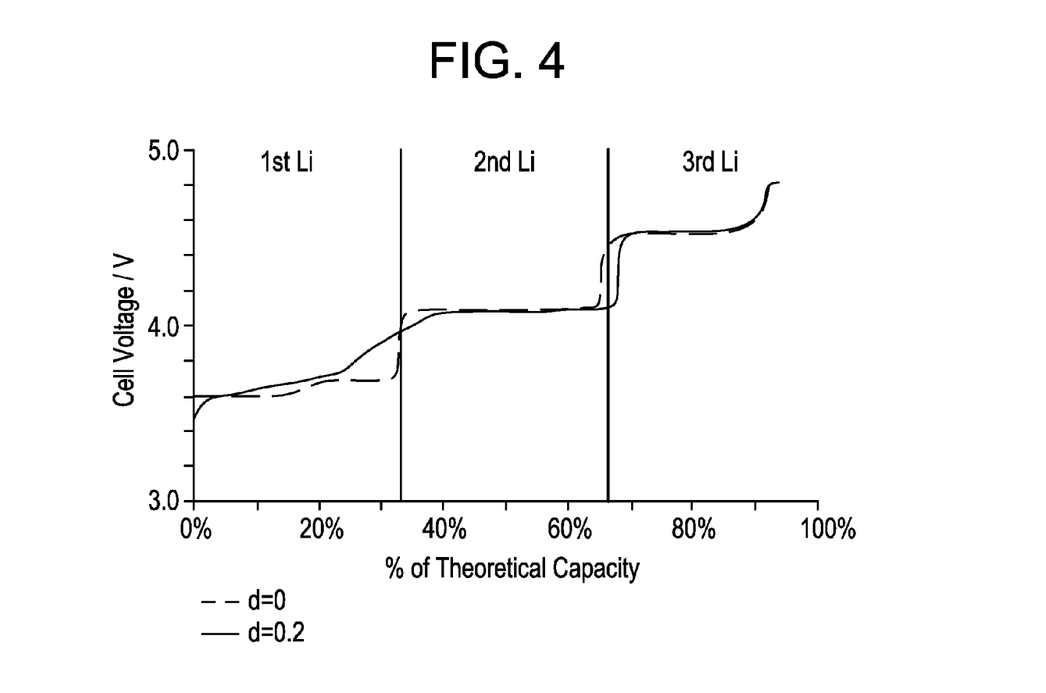
FIG. 4 is a voltage profile plot for $Li_{a-2d}V_{2-d}Nb_d(PO_4)_3$/1M $LiPF_6$ (EC/DMC)/Li cells (d=0, and 0.2).

Each cell was charged to 4.8 V at C/10 in order to delithiate the $Li_{a-2d}V_{2-d}Nb_d(PO_4)_3$ active material. FIG. 4 shows the voltage profiles for each of the $Li_{a-2d}V_{2-d}Nb_d(PO_4)_3$/1M $LiPF_6$ (EC/DMC)/Li cells. The niobium substitution results in a sloping appearance of the voltage profile for the first Li region, which becomes more profound as the substitution amount for niobium (value of stoichiometric variable d) increases from 0 to 0.2.

Figure 5:
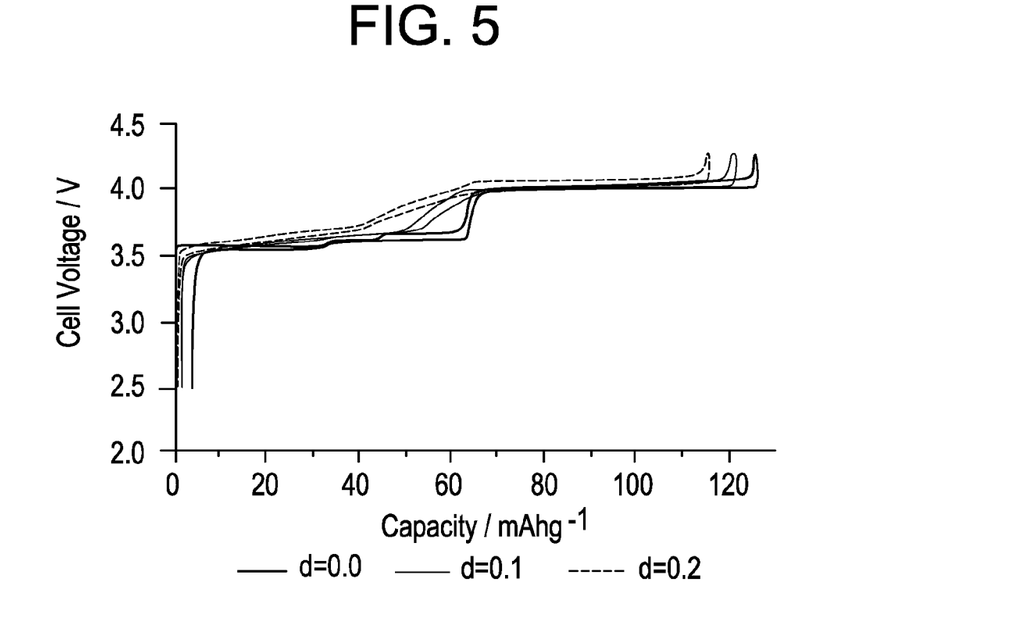
FIG. 5 is a plot of capacity vs. cell voltage for $Li_{a-2d}V_{2-d}Nb_d(PO_4)_3$/1M $LiPF_6$ (EC/DMC)/Li cells (d=0, 0.1 and 0.2).

The cells containing $Li_{a-2d}V_{2-d}Nb_d(PO_4)_3$ active materials for d=0, 0.1 and 0.2 were charged and discharged between 2.5 V and 4.2 V at C/5. FIG. 5 shows the charge and discharge profiles for each of the $Li_{a-2d}V_{2-d}Nb_d(PO_4)_3$/1M $LiPF_6$ (EC/DMC)/Li cells (d=0, 0.1 and 0.2).

EXAMPLE 8

Electrode active material samples representative of the general formula $Li_{a-2d}V_{2-d}Nb_d(PO_4)_3$ were synthesized per the teachings of Example 3 for d=0, 0.1 and 0.2.

For each sample, and electrode was made with 88% $Li_{a-2d}V_{2-d}Nb_d(PO_4)_3$ active material, 8% conducting carbon (Super P) and 4% PVDF binder (KYNAR® HSV 900), which were mixed in N-methylpyrrolidone (NMP) and the resulting slurry was coated on aluminum foil, and then dried at 120° C. under vacuum. The active loading of each electrode was 8-9 $mg/cm^2$.

Lithium-metal cells were constructed, each employing one of the cathodes, a lithium-metal counter electrode, an electrolyte containing 1M $LiPF_6$ solution in ethylene carbonate/dimethyl carbonate (2:1 by weight) and a dried glass fiber filter (Whatman, Grade GF/A) was used as electrode separator ($Li_{a-2d}V_{2-d}Nb_d(PO_4)_3$/1M $LiPF_6$ (EC/DMC)/Li). The cathode area was 2.85 $cm^2$.

Figure 6:
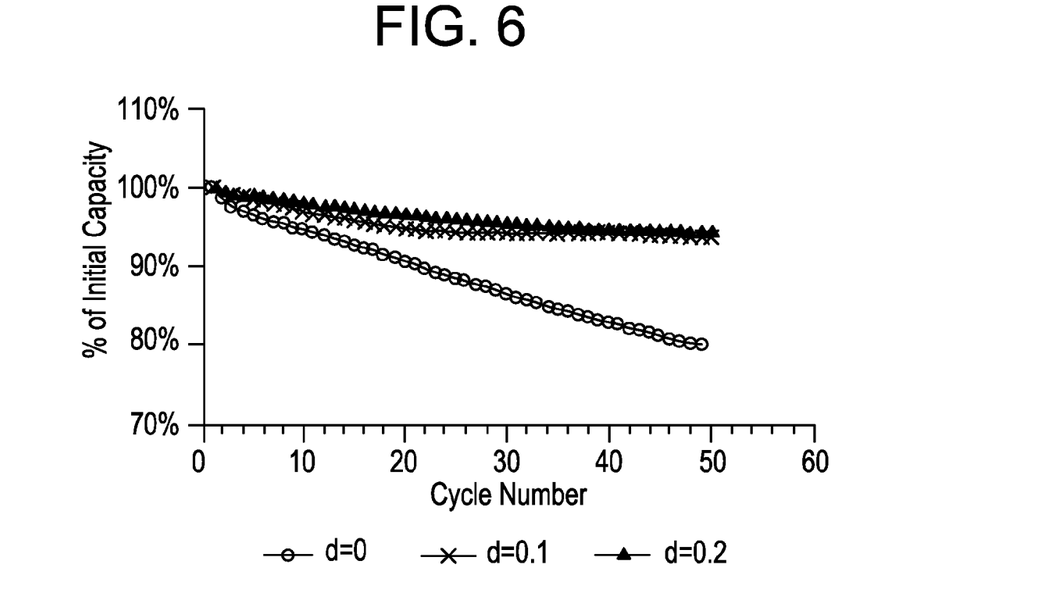
FIG. 6 is a cathode specific capacity plot for multiple cycles for $Li_{a-2d}V_{2-d}Nb_d(PO_4)_3$/1M $LiPF_6$ (EC/DMC)/Li cells (d=0, 0.1 and 0.2).

The cells containing $Li_{a-2d}V_{2-d}Nb_d(PO_4)_3$ active materials for d=0, 0.1 and 0.2 were cycled between 2.5 V and 4.3 V at C/5. FIG. 6 shows the cycling behavior of the $Li_{a-2d}V_{2-d}Nb_d(PO_4)_3$/1M $LiPF_6$(EC/DMC)/Li cells. The cells containing niobium-doped active materials ($Li_{a-2d}V_{2-d}Nb_d(PO_4)_3$, d=0.1 and 0.2) exhibited less capacity loss over multiple cycles compared to the undoped active material ($Li_{a-2d}V_{2-d}Nb_d(PO_4)_3$, d=0)

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:

1. A battery, comprising:
a first electrode comprising a first electrode active material represented by the general formula:

$$A_aV_bNb_c(PO_4)_3,$$

wherein:
(i) A is selected from the group consisting of elements, from Group I of the Periodic Table, and mixtures thereof, and 0<a<9;
(ii) 0<b<2,
(iii) 0<c<2,
(iv) wherein a, b and c are selected so as to maintain electroneutrality of the first electrode active material in its nascent state; and
(v) wherein V is stoichiometrically partially substituted with Nb;
a second counter-electrode; and
an electrolyte in ion-transfer communication with the first electrode and the second electrode.

2. A battery according to claim 1, wherein A is Li.

3. A battery according to claim 1, wherein the first electrode active material is represented by the general formula:

$$A_aV_{b-\frac{c}{V^V}}Nb_{\frac{c}{V^{Nb}}}(PO_4)_3,$$

wherein $V^V$ and $V^{Nb}$ represent the oxidation states of V and Nb, respectively, when the active material is in its nascent, state.

4. A battery according to claim 1, wherein the first electrode active material is represented by the general formula:

$$A_aV_{b-d}Nb_c(PO_4)_3,$$

wherein 0<d<2 and 0<c≦d.

5. A battery according to claim 1, wherein the first electrode active material is represented by the general formula:

$$A_{3-2d}V_{2-d}Nb_d(PO_4)_3,$$

wherein 0<d<2, $V^{Nb}$=5+, $V^V$=3+, and
wherein $V^{Nb}$ and $V^V$ represent the oxidation states of niobium and vanadium, respectively, in the active material's nascent state.

* * * * *